(12) United States Patent
Dougan et al.

(10) Patent No.: US 7,844,741 B2
(45) Date of Patent: Nov. 30, 2010

(54) GATEWAY

(75) Inventors: Damien Dougan, Belfast (IE); Louis Corrigan, County Meath (IE); Richard McConnell, Belfast (IE); Hans Hansen, Belfast (IE)

(73) Assignee: Aepona Limited, Belfast (GB)

( * ) Notice: Subject to any disclaimer, the term of this patent is extended or adjusted under 35 U.S.C. 154(b) by 602 days.

(21) Appl. No.: 11/793,419

(22) PCT Filed: Dec. 22, 2005

(86) PCT No.: PCT/IE2005/000148

§ 371 (c)(1),
(2), (4) Date: Jun. 20, 2007

(87) PCT Pub. No.: WO2007/067776

PCT Pub. Date: Jun. 29, 2006

(65) Prior Publication Data

US 2007/0268922 A1 Nov. 22, 2007

(51) Int. Cl.
*G06F 15/16* (2006.01)
(52) U.S. Cl. ...................................... 709/249
(58) Field of Classification Search .................. 709/249
See application file for complete search history.

(56) References Cited

U.S. PATENT DOCUMENTS 6,754,662 B1 * 6/2004 Li ............................... 707/101

2004/0259534 A1 * 12/2004 Chaudhari et al. ....... 455/414.1

FOREIGN PATENT DOCUMENTS

| WO | 03/091895 | 11/2003 |
|----|-----------|---------|
| WO | 2004/036855 | 4/2004 |

* cited by examiner

*Primary Examiner*—Vivek Srivastava
*Assistant Examiner*—Bryan Lee
(74) *Attorney, Agent, or Firm*—Jacobson Holman PLLC (57) ABSTRACT

A work flow manager (1) of a gateway comprises a process automation component (2), a policy engine (3), and a traffic gateway (4). The work flow manager (1) communicates via the internet (5) over IP with content providers (6) and content aggregators (7). On the other side it communicates over the Internet or over a private IP network, using diverse proprietary and known protocols with service enabler resources (20) including mobile network SMSCs, MMSCs and IMSs (IP Multi-Media Sub-systems). The process automation component (2) presents a GUI to generate a work flow definition in a high level business process execution language (BPEL), with interaction with the service enabler resources (20) which implement the process. The policy engine (3) interprets the BPEL to provide lower-level policy enforcement work, flows in a policy enforcement execution language (PEEL). The traffic gateway (4) interprets the PEEL to provide a low level language (traffic policy execution language, TPEL) for high performance implementation of steps of the work flow process. PRP means Policy Request Protocol, a lightweight protocol for AAA request/responses within the gateway 1.

15 Claims, 10 Drawing Sheets

Sample Traffic Rule    Sample Management Rule

GATEWAY

This is a national stage of PCT/IE2005/000148 filed 22 Dec. 2005 and published in English.

FIELD OF THE INVENTION

The invention relates to a gateway for interfacing between the content/service provider domain and communication networks such as mobile networks.

PRIOR ART DISCUSSION

Our prior PCT Specification No. WO2004/036855 describes such an access gateway. In this gateway a work flow manager parses a message to determine a routing list, and it embeds a routing list within a message. The work flow manager is a service within the gateway which subscribes to a middleware channel.

The invention is directed towards achieving improved work flow management in such a gateway, both in terms of flexibility and real time performance.

SUMMARY OF THE INVENTION

According to the invention, there is provided gateway for interfacing between content provider servers and a communication network for delivery of content to user devices, the gateway comprising a work flow manager comprising:
  a process automation component for interfacing with operators and defining according to operator inputs required work flows;
  a traffic gateway for managing execution of traffic flow for delivery of content;
  a policy engine for interfacing with the process automation component and with the traffic gateway;
  wherein each of the process automation component, the policy engine, and the traffic gateway execute workflow instances; and
  wherein the policy engine workflow instances act as decision points, and the process automation component workflow instances and the traffic gateway workflow instances act as enforcement points.

In one embodiment, the decision point workflow instances execute work flow rules to determine compliance of work flows with a service level agreement and generate responses to requests from the enforcement point workflow instances.

In one embodiment, the policy engine comprises an interface for access to a stored mark-up language service level agreement representation.

In one embodiment, the process automation component generates a human-readable operator-level model of desired content routing work flows, and allows dynamic operator-driven modification of said work flow.

In another embodiment, the process automation component automatically defines said desired work flows independently of the service level agreement.

In one embodiment, each request is an authentication, authorising and accounting request.

In one embodiment, the process automation component workflow instances generate:
  for some work flow processes only a single policy enforcement point request to initiate said processes,
  for some work flow processes a policy enforcement point request for every process task, and
  for some work flow processes a policy enforcement point request for only key process tasks, and
  for some work flow processes a conditional policy enforcement point request for some or all process tasks.

In one embodiment, the process tasks operate with process data at different levels within a process data model for the desired work flows.

In a further embodiment, the process data model incorporates branches for different content provider servers.

In one embodiment, each branch includes process data permissions governing read-only or write-enabled access to content on per-user and per-content provider server basis.

In one embodiment, the policy engine comprises:
  policy decision nodes, each having a traffic policy, a management policy and a decision server;
  traffic nodes communicating with the decision servers; and
  management nodes communicating with the decision servers,
  wherein the management nodes access the operator-level workflow model and the traffic nodes access a traffic-optimised work flow model.

In one embodiment, the traffic-optimised work flow model comprises a plurality of tables linked with a starting content provider server hash table.

In one embodiment, the tables are linked from said content provider hash table according to content communication protocol.

In one embodiment, there is a link for SMS communication, a link for MMS communication, and a link for WS communication.

In one embodiment, each table has a counter which is incremented for every occurrence of a parameter.

In one embodiment, a table at the end of a chain automatically computes data according to entries to the tables in the chain.

In one embodiment, the traffic gateway comprises a traffic policy sub-cluster for each of a plurality of traffic protocols.

In one embodiment, each policy sub-cluster receives requests from the policy engine, and generates responses.

In one embodiment, each sub-cluster communicates with a traffic load balancer, which in turn routes traffic onto the mobile network or a content provider server network.

BRIEF DESCRIPTION OF THE DRAWINGS

The invention will be more clearly understood from the following description of some embodiments thereof, given by way of example only with reference to the accompanying drawings in which.

DETAILED DESCRIPTION OF THE INVENTION

Figure 1:
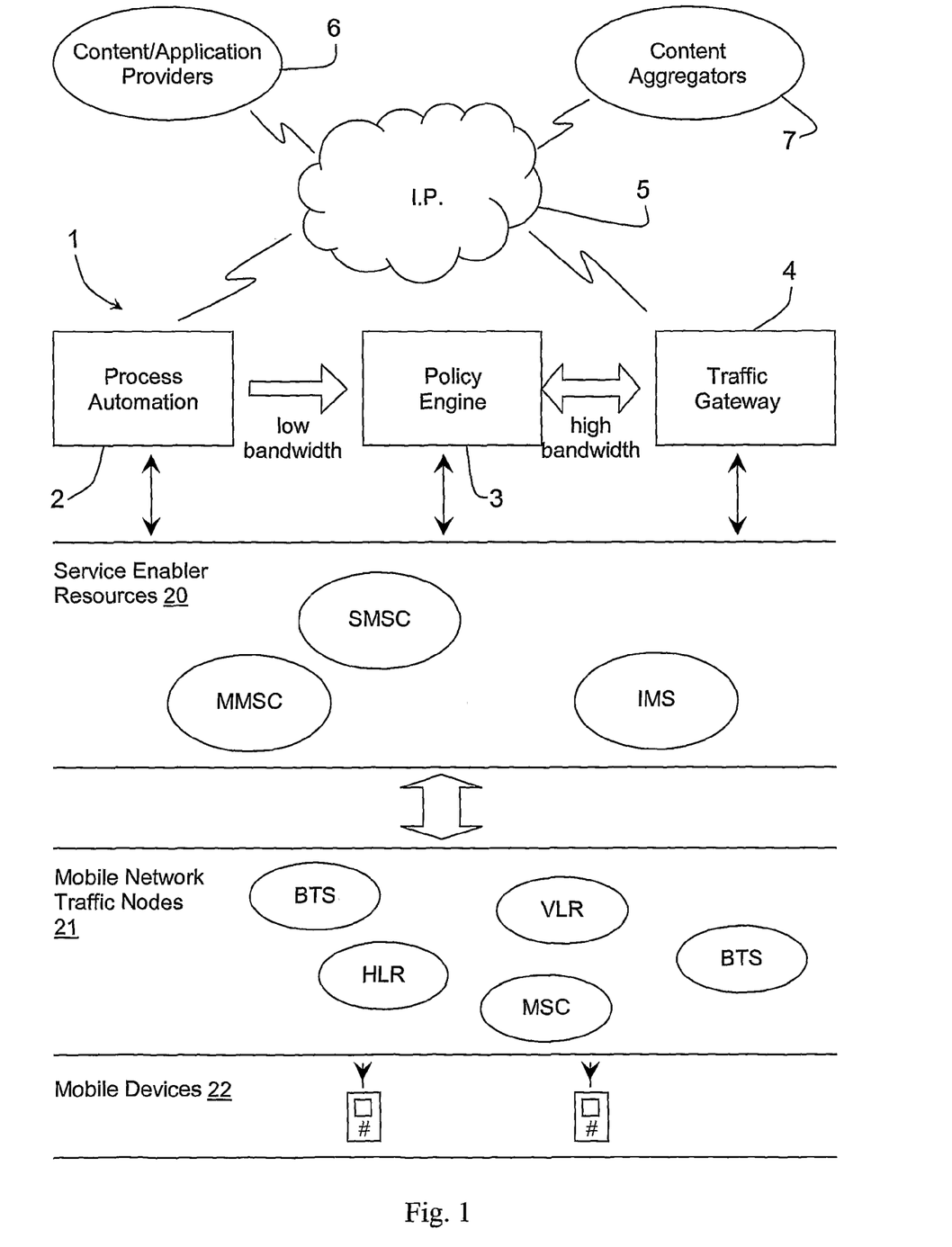
FIG. 1 is a block diagram showing the major work flow management components of a gateway of the invention and its environment.

Referring to FIG. 1 a work flow manager 1 of a gateway comprises a process automation component 2, a policy engine 3, and a traffic gateway 4. The work flow manager 1 communicates via the internet 5 over IP with content providers 6 and content aggregators 7. On the other side it communicates over the Internet or over a private IP network, using diverse proprietary and known protocols with service enabler resources 20 including mobile network SMSCs, MMSCs and IMSs (IP Multi-Media Sub-systems). These in turn communicate over the internal communication mechanisms of the mobile network infrastructure with mobile network traffic elements 21 including BTSs, HLRs, MSCs and VLKs. The elements 21 in turn communicate with the mobile devices 22 via the BTSs.

This diagram therefore illustrates the overall context of the work flow manager. There is a "three dimensional" aspect to traffic management for providing content or services to mobile devices, namely content, mobile network, and real time work flow management.

Figure 2:
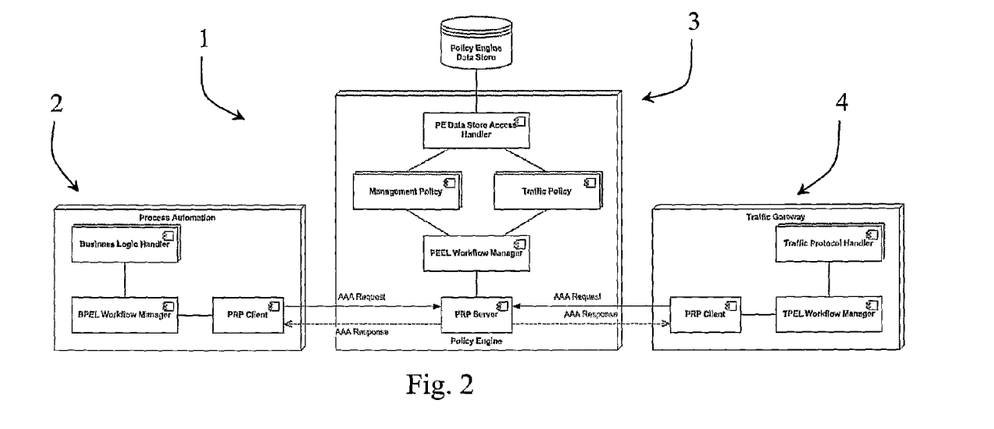
FIG. 2 is a diagram showing a work flow manager of the gateway in more detail.
Figure 3:
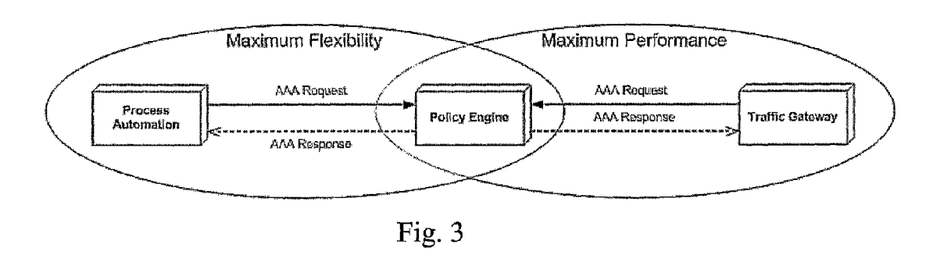
FIG. 3 is a diagram showing the requirements at different levels of the manager.

Referring to FIGS. 2 and 3 the following are the primary roles of the components. The process automation component 2 presents a 'human friendly' tool such as a GUI to generate a work flow definition in a high level business process execution language (BPEL), with interaction with the service enabler resources 20 which implement the process. The policy engine 3 interprets the BPEL to provide lower-level policy enforcement work flows in a policy enforcement execution language (PEEL). The traffic gateway 4 interprets the PEEL to provide a low level language (traffic policy execution language, TPEL) for high performance implementation of steps of the work flow process. PRP means Policy Request Protocol, a lightweight protocol for AAA request/responses within the gateway 1. "SLA" means service level agreement.

Thus, the three components of the WFM 1 provide an intelligent bridge between the service provisioning side and the real time process implementation side. There is bi-directional communication across the three components in real time as a service is provided to a subscriber so that there is an optimum trade off at any point in time between performance and flexibility, as illustrated diagrammatically in FIG. 3 and described in more detail below.

The workflow manager 1 is distributed across the process automation, the policy engine, and the traffic gateway. BPEL—(Business Process Execution Language) is a high level, highly flexible workflow language. PEEL (Policy Engine Execution Language) is a mid-level, high performance, good flexibility workflow language. TPEL (Traffic Proxy Execution Language) is a low-level, highly performant workflow language. The term "AAA" means Authentication, Authorisation, Accounting.

Figure 12:
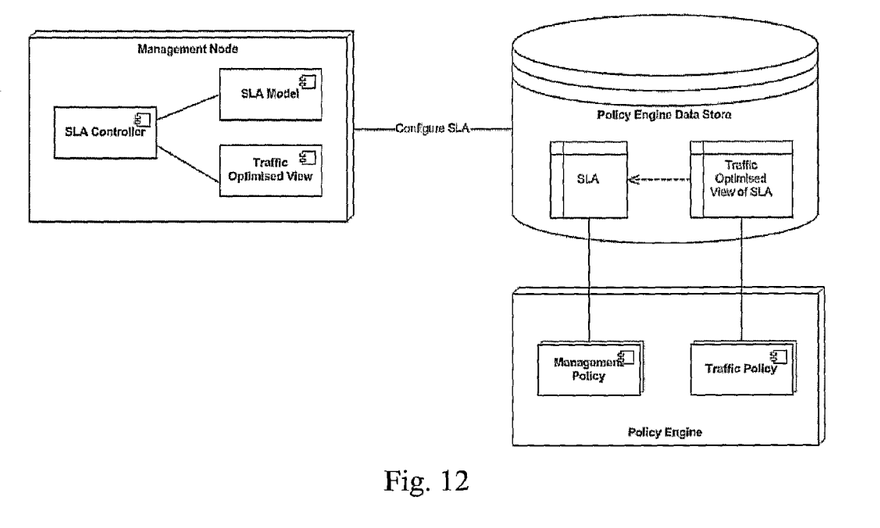
FIG. 12 is a diagram showing interconnection between a policy engine and its data store.

The process automation component 2 interfaces with operators and defines according to operator inputs required work flows. The traffic gateway 4 manages execution of traffic flow for delivery of content. The policy engine 3 interfaces with the process automation component and with the traffic gateway. Each of the process automation component, the policy engine, and the traffic gateway execute workflow instance, referred t below as "BPEL workflows", "PEEL workflows", and "TPEL workflows" or simple "BPEL", "PEEL", and "TPEL". The policy engine workflow instances act as decision points, and the process automation component workflow instances and the traffic gateway workflow imstances act as enforcement points. The decision point workflow instances execute work flow rules to determine compliance of work flows with a service level agreement and generate responses to requests from the enforcement point workflow instances. The policy engine has an interface for access to a stored mark-up language service level agreement representation. This is illustrated in FIG. 12, access being via an optimised view of the SLA.

The three languages are decoupled, without compiling from one to the other. The process automation component 2 can communicate with policy engine 3. i.e. the BPEL workflow includes a step which requires AAA from the policy engine 3. Thus BPEL workflow can invoke PEEL workflow. The traffic gateway 4 can communicate with the policy engine 3. i.e. the TPEL workflow includes a step which requires AAA from the policy engine. Thus TPEL workflow can invoke a PEEL workflow. The process automation and the traffic gateway do not interact. i.e., whilst the process of provisioning a service on the gateway is defined in BPEL and executed via the process automation component, once the service is provisioned, traffic goes through the traffic gateway 4.

No one language is compiled into a lower language form. For example, TPEL is not automatically created from PEEL. Further, there are no dependencies between BPEL, PEEL, and TPEL—they each define workflows within specific parts of the gateway in a mechanism which is most suited to the performance/flexibility characteristics of the data being processed by that part of the gateway.

Referring again to FIG. 2, BPEL provides high flexibility on process automation, invoking business logic handlers to perform tasks in the process, and using a PRP Client (which can be considered a business logic handler for the policy, engine) to perform AAA operations when the workflow definition for a given process demands it. TPEL provides high performance on traffic workflows, invoking protocol handlers to send and receive data, and the PRP client to perform AAA operations when the workflow definition for a given traffic channel demands it. PEEL provides high performance on policy decision requests. The individual requests are handled by policies dedicated to management and traffic operations. Effectively, the policy handlers are the equivalent to the business logic handlers invoked by the BPEL, or traffic protocol handlers invoked by the TPEL.

Compilation to actual machine code would mean having to build libraries and link them into the service. This is a relatively time consuming task to do on a live system handling large volumes of transactions per second, and prior systems may even mean bringing services off-line until they are reloaded with additional library and configuration data.

Alternative methods are to compile to something short of actual machine code—which is then run on a virtual machine. This is still a relatively time consuming task, still needs optimisation of the resulting byte code. It does however negate any requirements on restarting the service.

However, the approach the invention has taken is to have the benefit of near low-level execution combined with already-optimised code. Instead of compiling one language into a lower level language, we transform the high level language into a low level object structure who's natural form and function provides for the required degree of flexibility and performance. This object structure is then processed by an already-optimised engine—capable of handling any dynamically built object structure with the same degree of flexibility and performance.

Advantageously, the transformation takes only a small fraction of the time required of compilation. The resulting object structure is immediately available for use, there being no need to bring the service offline. The engine which processes the object structure has already been optimised and is fully capable of performance and flexibility over any resulting object structure.

Figure 13:
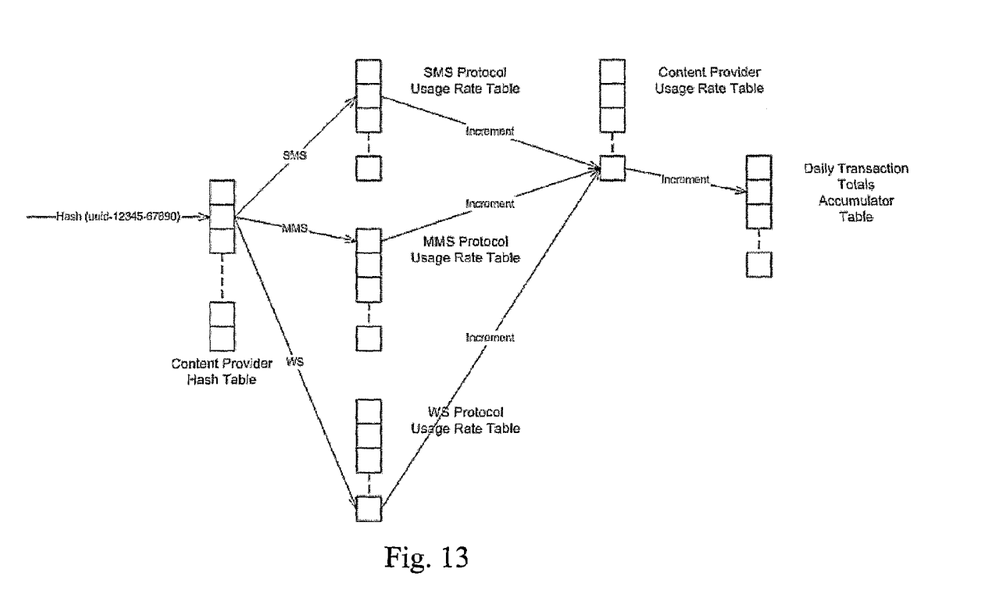
FIG. 13 is a diagram showing interconnection of rate tables for work flow management.

Consider FIG. 13, which is a diagram of a resulting object structure. There is an entry point for the engine to begin processing in terms of the Content Provider Hash Table (the term "table" does not imply a database table). Each entry in this hash table will have a random-access set of protocol objects, which the engine will process as required by the current traffic protocol. Each protocol object will point to an entry in a protocol usage rate hash table—in the figure, that means 3 objects pointing to SMS, MMS and WS. Suppose we have an SMS message. The engine will have immediate access to the SMS protocol object, from which it can immediately access the correct entry in the SMS Protocol Usage Rate table (again, not a database table). The engine will then invoke a throttling method on the SMS Protocol Usage Rate entry object (this is why we have actual objects with invocable methods, rather than simply "dumb" database tables holding data) to determine if the SMS message exceeds per-second throttling. These objects extend classes defined in the engine, and the graph of connected object structures are thus data-driven embodiments of the engine. The SMS Protocol Usage Rate entry object will automatically invoke an increment method on the Content Provider's Usage Rate table, which will in turn automatically invoke an increment method on the daily transaction rate accumulator table. Should any of these increment methods exceed the maximum usage rate, the increment method will fail, and the engine will be aware that the current SMS traffic message has breached policy as defined in the SLA.

Figure 4:
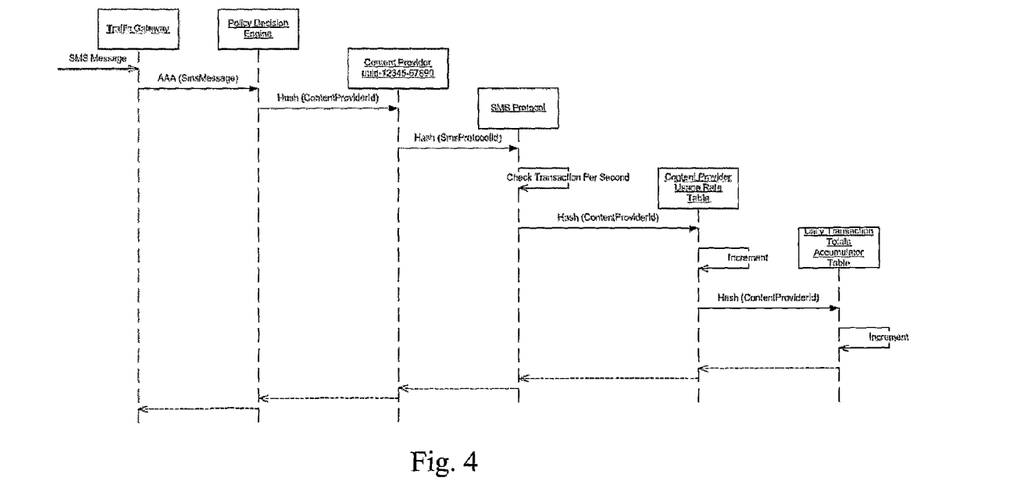
FIG. 4 is a message flow diagram for SMS traffic handled by the gateway.

Referring to FIG. 4, this is an example which is deliberately simple, but the engine is capable of improving performance through parallelism. If the transformation determines that multiple checks can be made in parallel, then this will be carried out to improve throughput and reduce latency on policy decisions.

Figure 5:
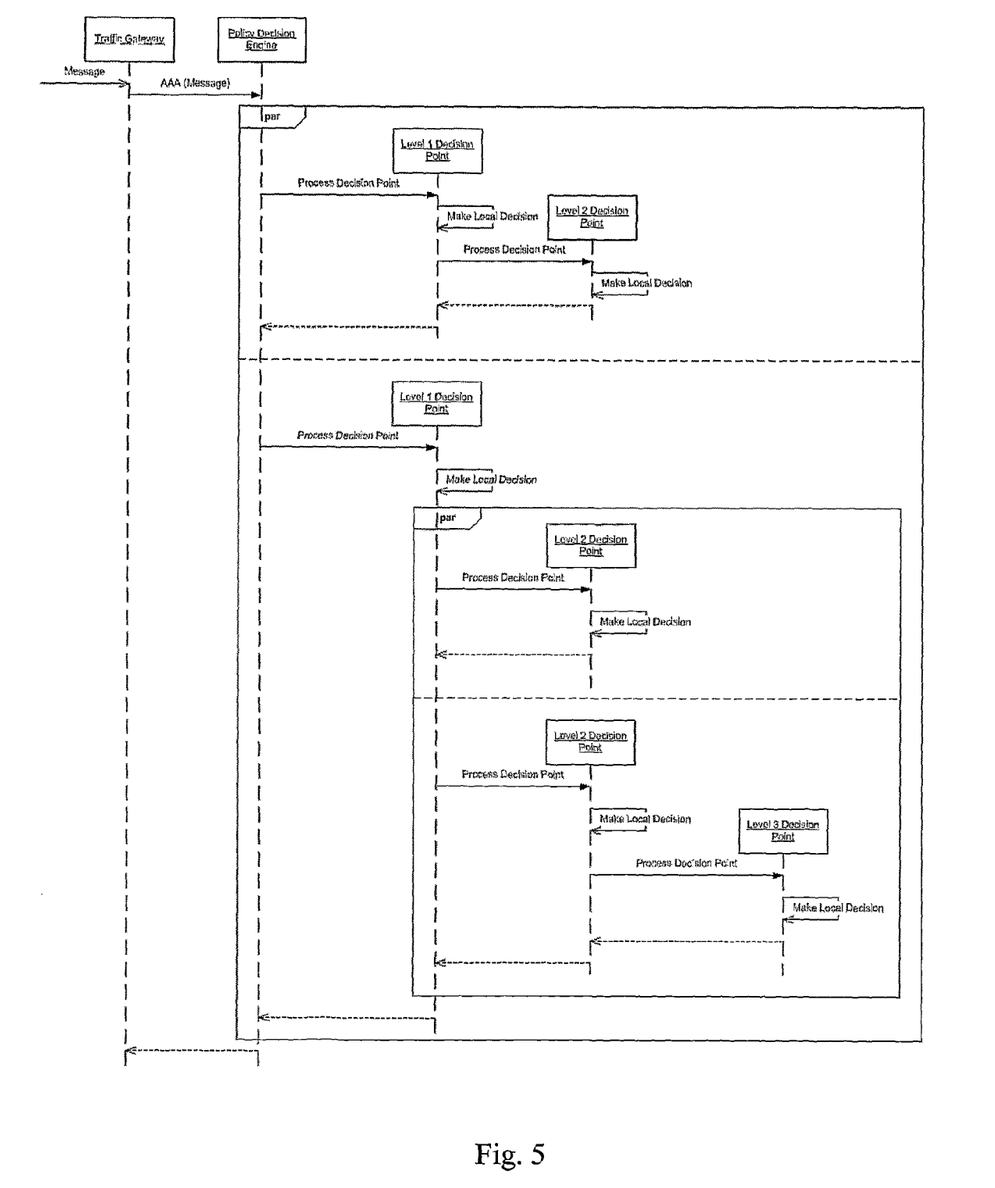
FIG. 5 is a diagram showing parallel decision making in the work flow manager.

The diagram of FIG. 5 shows the policy engine 3 making two level I decisions in parallel. The first level I decision requires a single level II decision to resolve. The second level I decision (which will be processed in parallel with the first) has itself two parallel decisions to be made at level II—the second of which has a level III decision to resolve. This diagram highlights how the policy engine 3 can provide parallelism across arbitrary object structures (since the number of parallel tasks and the depth of decision points is arbitrary).

Process Automation AAA (Authentication, Authorising and Accounting) requests require maximum flexibility to deal with privileged users performing high level operations, which may have multiple component lower-level operations, against complex data structures. Thus the policy engine 3 is capable of making decisions and enforcing policy across multiple levels of functionality, and ensuring data access restrictions are enforced.

This task is furthrer complicated by the fact that a Service Level Agreement provides a user-defined view of the available processes. It does not provide a system level view. Further, even if conventional methods of solving this problem (namely having a system level view—perhaps hidden—within the SLA) are employed, it does not offer the flexibility which the gateway 1 provides—because the gateway 1 is capable of hosting dynamically defined business processes—thus the SLA would become dynamic, making it impossible to have two-way non-repudiation of the SLA (since it too would be constantly in a state of flux).

Figure 6:
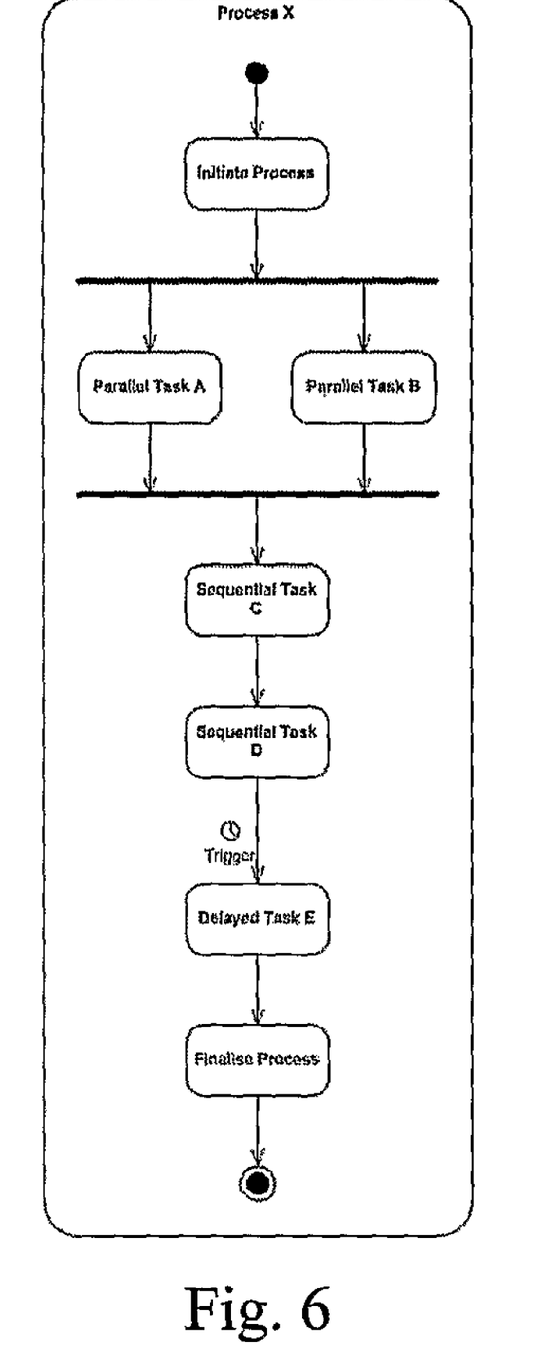
FIG. 6 is a diagram showing constituent parallel, sequential, and delayed tasks.
Figure 7:
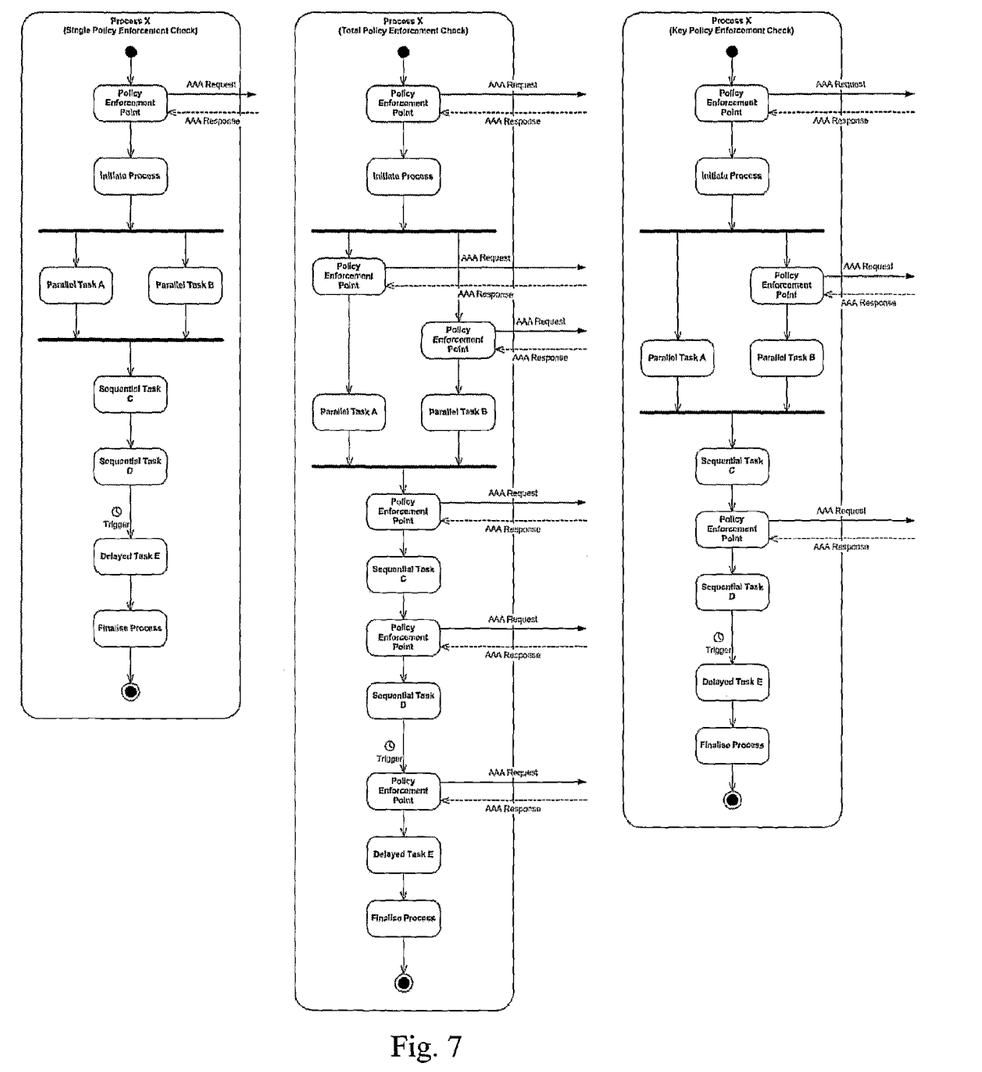
FIG. 7 shows different policy enforcement points.

Consider the process of FIGS. 6 and 7—Process X. The SLA would indicate whether or not a user is allowed to invoke Process X. However, because Process X is actually composed of 5 discrete tasks (and could be subject to change in the future should additional tasks be added to the process), the policy engine must be able to flexibly control the constituent tasks.

Figure 14:
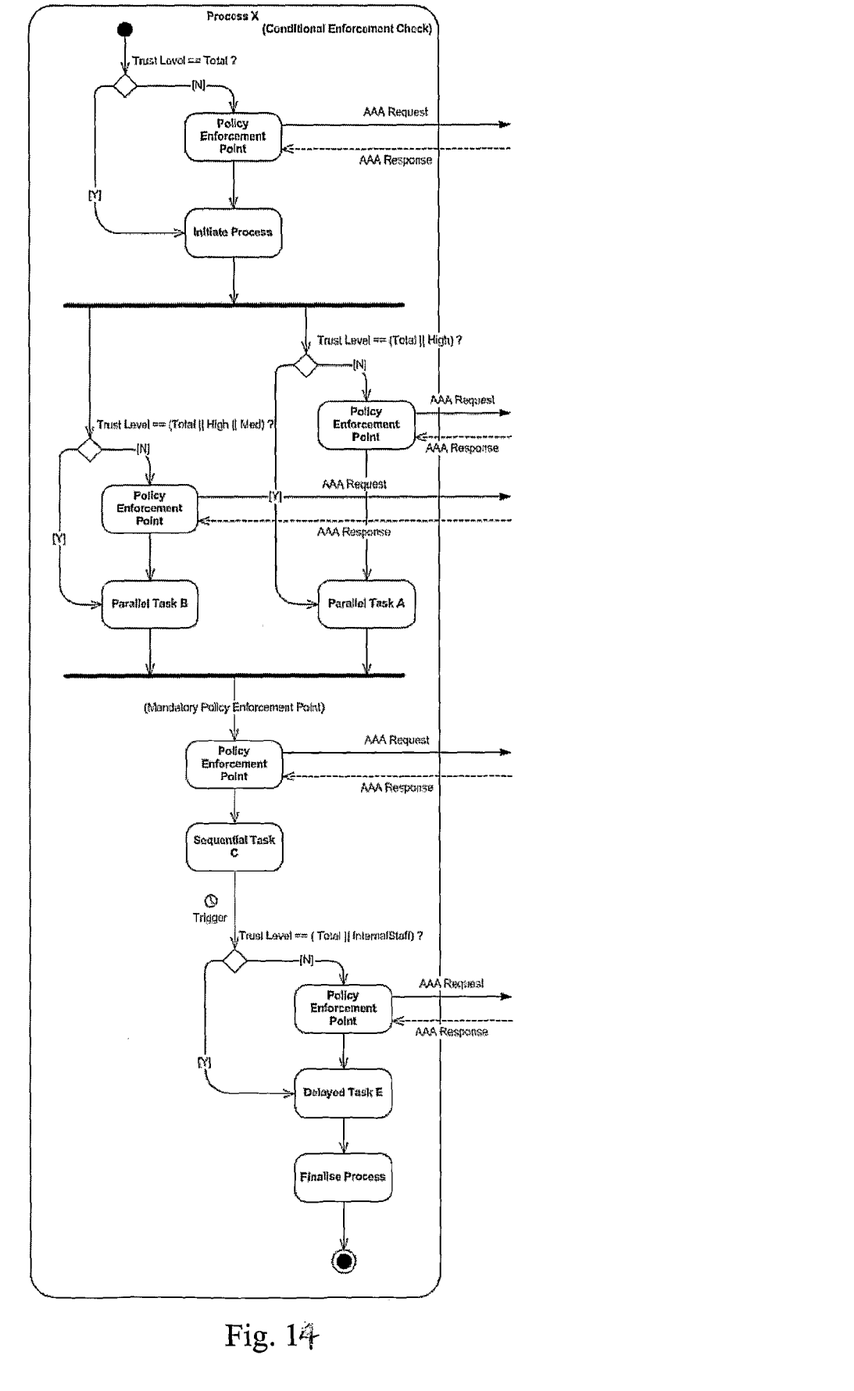
FIG. 14 is a diagram showing conditional policy enforcement checks within a workflow, which interact with a Service Level Agreement establishing a level of trust, to provide dynamic degrees of policy enforcement for the same workflow.

The AAA requests associated with this Process to be defined independently of the SLA. For example, each task can have an AAA request associated with it, or the Process as a whole can have an AAA request associated with it—or only key data-sensitive tasks can have an AAA request associated with them. This decision can be made on a per-Process basis, so processes affecting critical or sensitive data can have additional checks made as appropriate. This is shown in FIG. 7. The gateway 1 has separated the definition of the SLA privilege from the definition of the process automation policy decision points. However, there is also scope for the SLA to dictate which degree of checks need to be performed (i.e. establishing a level of trust within the SLA). For example, referring to FIG. 14, there is the flexibility to define conditional policy checks, and allow the SLA to establish a degree of trust—trusted users need only be subject to key policy enforcement checks, whilst untrusted users may be subjected to all checks.

Figure 8:
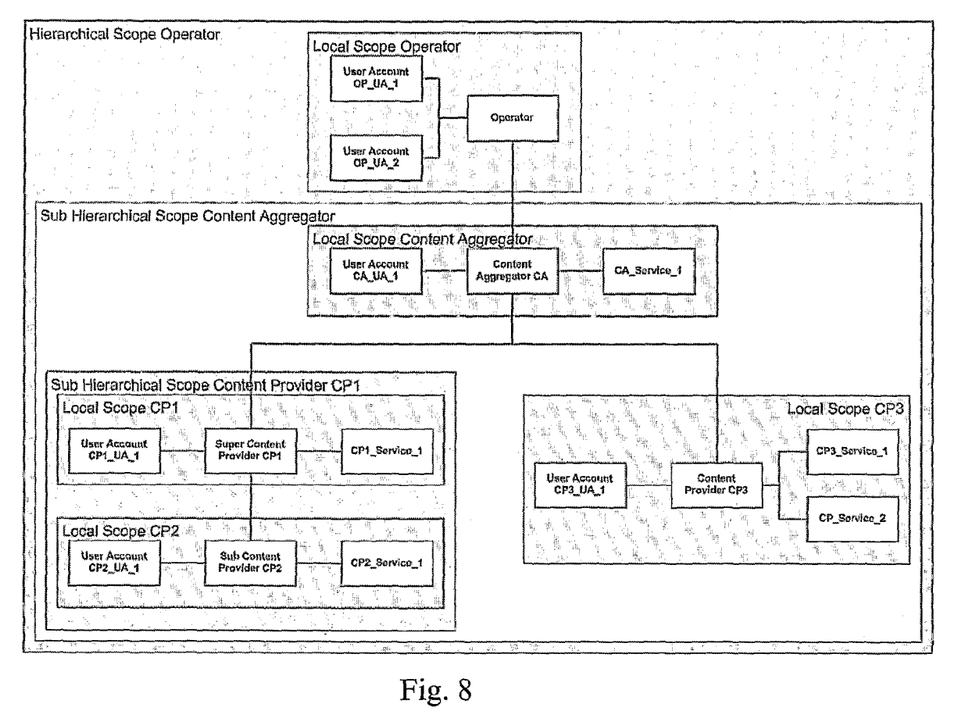
FIG. 8 shows a hierarchical data model for the work flow manager.

Each of these individual tasks may operate on different data within gateway 1's flexible data model. This data model is not flat—it is a hierarchy, and therefore the policy engine must be capable of making decisions about data access anywhere within the hierarchy. This is shown in FIG. 8.

Suppose User Account OP_UA_1 is an Administrator, and User Account OP_UA_2 is a Customer Care Agent. Then Gateway 1 may allow OP_UA_1 read/write access to the entire data model hierarchy, whilst OP_UA_2 may only have read access to the entire hierarchy.

The gateway 1 may allow Content Aggregator's User Account CA_UA_1 to access the Content Aggregator's own Service (CA_Service_1), but limit CA_UA_1 to manipulating his child Content Providers (CP1, CP2)—but not their Services.

As another example, User Account CP3_UA_1 cannot access any data outside of Local Scope CP3.

The policy engine 3 is configured with a number of PEEL workflow definitions. The policy engine 3 can determine lower-level actions to implement a main action (by invoking various management or traffic policy operations defined in the PEEL WF). It uses a cascading privilege manager to support policy decisions across multiple levels of a hierarchy. The cascading privilege definition allows the policy engine to make decisions about delegated privileges defined in the SLA (i.e. privileges which are inherited by virtue of an entity's position in the data model hierarchy). If the policy engine 3 determines that a particular action can not be invoked as requested either by a BPEL WF or TPEL WF policy decision request task, then the policy decision request will be rejected with an indication of the nature of the rejection.

The policy engine provides generic support for the configurable handling of the (above mentioned) policies on a per service and per service provider basis through a (Web Service Based) GUI enacting on an underlying rule based policy management engine. It represents a multi dimensional hierarchy of actors and privileges—which is then mapped into a single dimension for management. It provides the ability to develop configurable orchestrations of policy enforcements across the network enablers which cause the service enablers to perform differently according to the service or service enabler accessing them—without having to provide isolated service enabler environments for each service or service enabler.

The policy engine is able to analyse QoS and provide SLA reporting without impact on the traffic using 'echoing' or 'wiretapping' at the traffic gateway level and non-intrusive monitoring at the policy engine level. This relates/integrates with the configurable type checking in the traffic gateways.

The policy engine provides access to diverse $3^{rd}$ party legacy and proprietary systems and protocols through protocol adaptors, and the ability to extract and implement policy management criteria from such adaptors. Thus the policy engine can use $3^{rd}$ party systems—whether that be as data sources for input to the policy making decision, or by delegating authority on making the decision (perhaps using input gathered from The gateway 1 and/or other $3^{rd}$ party systems) to one or more external policy decision points.

The policy engine's work flow manager performs workflow automation and configurable logging to provide highly customisable, event driven SLA (Policy) and QoS monitoring. It uses workflow automation using Web Service and proprietary protocols and methods to build automated sequences (chains) of operations across diverse and disjoint underlying (telecoms, non-Web services) systems and platforms.

Another aspect of the policy engine is it's facility to provide an atomic part or parts of the operation sequence of a service either by providing a mechanism to access the service or by providing controlled access to that service through the gateway 1—with or without the knowledge of the service provider (i.e. the developer of the end service)

Figure 10:
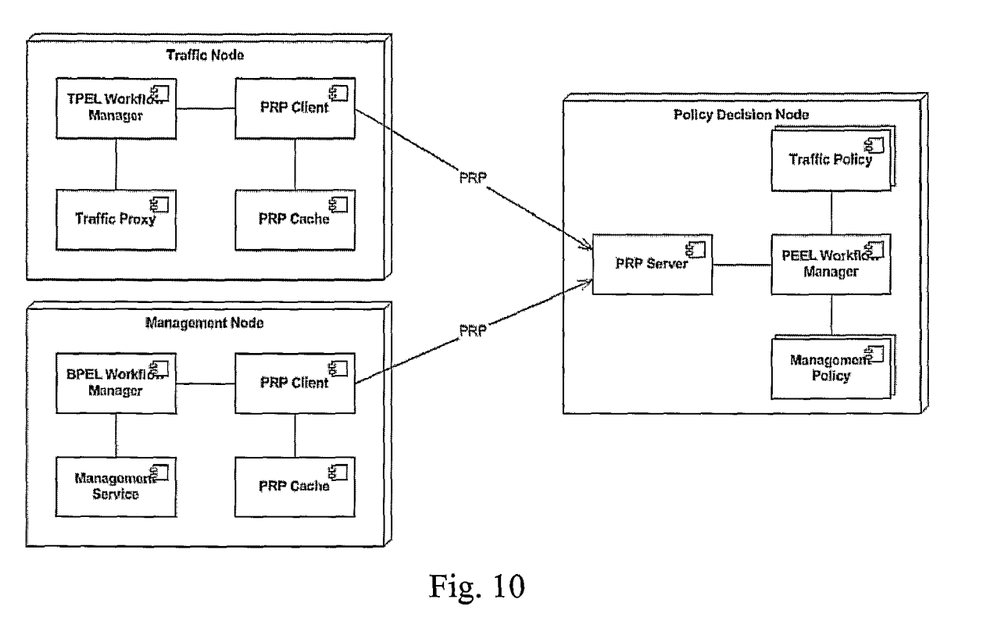
FIG. 10 is a diagram showing a policy decision node.

PEEL is used where the real time workflow automation is provided in a form which uses the data format similar to that provided by BPEL, but is implemented in such a way that no central decoding of the data needs to be performed, but where an interpretation mechanism is available to each decoding entity through which results in a high performance configurable workflow mechanism. The policy engine contains optimised rules for different types of traffic and management operations. The structure of the policy engine is shown in FIG. 10.

Media-rich content may include additional rules for enforcing MIME type limitations—something which is not necessary on plain text payloads like SMS texts.

The PEEL workflow is selected by the PRP Server using information contained in the PRP request.

Figure 11:
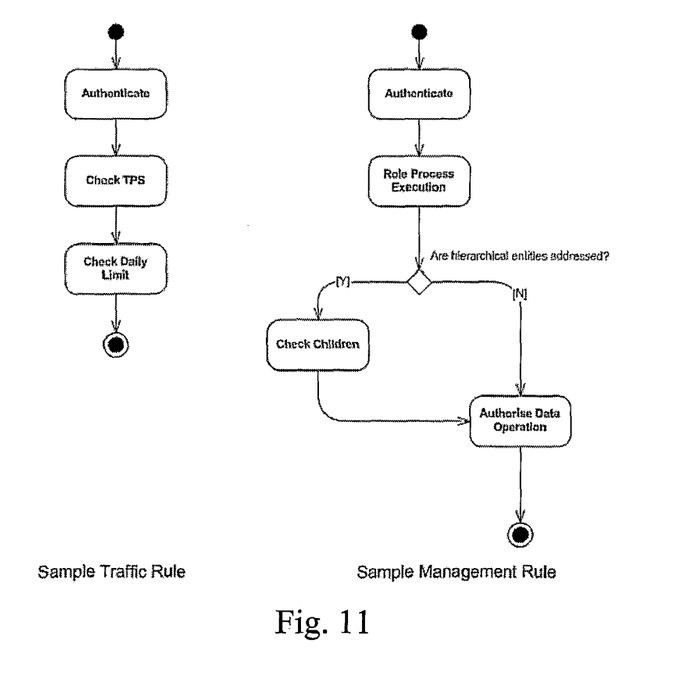
FIG. 11 is a pair of flow diagrams showing sample rule workflows in a policy engine of the work flow manager.

FIG. 11 shows sample rule workflows in the policy engine. Any part of a rule can be bypassed if a cached entry is present. For example, since Authentication details are the same for the same application making requests across different traffic protocols, the Authentication details can be cached in the PRP Client, and an Authenticated Token can be supplied, which means the policy engine does not attempt to re-authenticate.

There is caching of components within a policy engine workflow as well as the BPEL workflow and TPEL workflow—providing a highly performant cache hierarchy.

To address the different needs of management and run-time traffic performance from a single data source, a policy engine data store supports optimised views of the SLA. FIG. 12 shows policy engine views on the data store.

The Traffic Optimised View of the SLA is automatically created when the SLA is updated. For example, consider an SLA clause which dictates the following limitations on a content provider's applications:
  SMS Applications have a maximum summation of 50 TPS
  MMS Applications have a maximum summation of 20 TPS
  Web Service Applications have a maximum summation of 100 TPS
  The Content Provider has a maximum throughput of 125 TPS across all active applications
  The Content Provider has a maximum daily throughput of 10,000 transactions across all active applications.
The SLA would be defined in XML, for example:

```
<Sla>
    <ContentProvider> uuid-12345-67890 </ContentProvider>
    <ApplicationClauses>
        <Clause>
            <Type> Sms </Type>
            <MaxRate> 50 </MaxRate>
        </Clause>
        <Clause>
            <Type> Mms </Type>
            <MaxRate> 20 </MaxRate>
        </Clause>
        <Clause>
            <Type> WebService </Type>
            <MaxRate> 100 </MaxRate>
        </Clause>
        </ApplicationClauses>
        <ProviderClauses>
    <Clause>
        <Type> Throughput </Type>
        <Value> 125 </Value>
    </Clause>
    <Clause>
        <Type> DailyLimit </Type>
        <Value> 10000 </Value>
    </Clause>
    </ProviderClauses>
</Sla>
```

It is not feasible to process this XML on high traffic throughput as there will be multiple content providers submitting traffic to the same Policy Node, and XML processing is inherently costly. Further, the XML definition does not in itself provides a means to keep track of usage against the clauses. Therefore the traffic optimised model of the SLA is generated as follows:

FIG. 13 show optimised traffic model for a sample SLA. The technology allows any type of table to be linked to the content provider hash table, with the type of table(s) being defined within the SLA (because the tables are created by performing a translation on the SLA). Thus, because the SLA is defined on a per-Content Provider basis, different Content Providers can have different links to different types of tables. As a result of processing the SLA for a given Content Provider, dependency links can be created to model clauses that need to be processed by the engine. The list is automatically generated by transformation of the SLA defined for a given ContentProvider. Each table has a counter which is incremented for every occurrence of a parameter. This is dependent on the SLA clause. Some clauses may result in a counter being created. Others may result in a rangeOperator method being created. For example, a Billing Clause may have a min/max charge amount—so the object structure would create a rangecheck method that determines if the cost of the message lies between the allowed charge range.

There are a number of tables which are defined in the policy engine traffic-optimised view. Whenever the SLA is created/ updated for a content provider, entries are written to a content provider hash table, allowing the content provider's unique identifier to be used to quickly hash into all supported protocols. These supported protocols are also set up to trigger increments on the total throughput and daily limit tables.

Thus, whenever an application invokes run-time traffic, the usage table for the protocol defined for the content provider that owns the application is updated—with throttling limits applied. Maximum throughput and daily usage limits are also automatically applied. Only if all entries in the chain (modelling all clauses in the SLA which are applicable to the application) pass shall the policy engine allow the traffic to proceed. But there is no need to process the SLA on a per-message basis—in fact, the SLA has been used to dynamically create a data structure whose natural form and function is to enable highly performant rules-based checking of run-time traffic.

The traffic gateway is mainly configured to implement a work flow in real time for transactions. It is configured for traffic message channels using a low-level high-performance TPEL language.

There are two main categories of transaction to be handled, "pass-through" and "convergent". For pass-through transactions there is minimal interaction with the engine 3, only direct implementation with high performance of a relatively simple work flow series of actions. An example is in cases where Multimedia Messaging services are provided in native MM7 format. In this case service related traffic will be provided directly to the Traffic Proxies in the MM7 format, and no decoding or translation of the data is required for transmission to the destination device. In this case the policy enforcement will be provided by monitoring the data stream provided in MM7 format, through the use of low-level TPEL operations which use an inherent knowledge of the MM7 packet formats to implement low level policy enforcement. Thus policy enforcement components can be deployed within the traffic engine and be invoked by TPEL operations where it is suitable to do so (i.e. where the policy decision can be made entirely using the current message without further context). Where policy enforcement needs to be made in conjunction with context (e.g. historical usage patterns to determine transaction rates), TPEL will use PRP to have the Policy Engine make the request with full contextual knowledge of the application and/or content provider's recent traffic usage (where the window of retainment of contextual information is defined in the SLA and represented in the object structure—e.g. transactions per second, max transactions per hour).

For convergent transactions there is bi-directional interaction between the gateway and the engine 3 according to decision steps of the WF. The following is an example. A Service Workflow may define the services as a sequence of operations using multiple Service Enablers and Multiple Service Data Formats—for example using a specifically formatted Mobile Originated Short Message, containing a specific text keyword to indicate to an Application the data required for download. The service data may be supplied from the application server in an internet format, for example in the form of .gif file, but may require delivery in SMIL format over MMS. In this case, the mapping of the data coming through the traffic gateways to the specific data feeds and formats required can only be carried out through interaction of the policy engine.

The traffic gateway provides the ability to provide configurable type checking across the network enablers which cause the service enablers to perform differently according to the service or service enabler accessing them—without having to provide isolated service enabler environments for each service or service enabler. It also executes real-time workflows for highly performant-type checking. These workflows are configured for the various message channels on The gateway 1, allowing different message channels to have their own optimised workflows.

Traffic Gateway AAA requests require maximum performance to deal with privileged users performing large volumes of messages demanding low latency through the platform. Such traffic will have various constraints in terms of transactions per unit time, maximum transactions per unit time etc.

Figure 9:
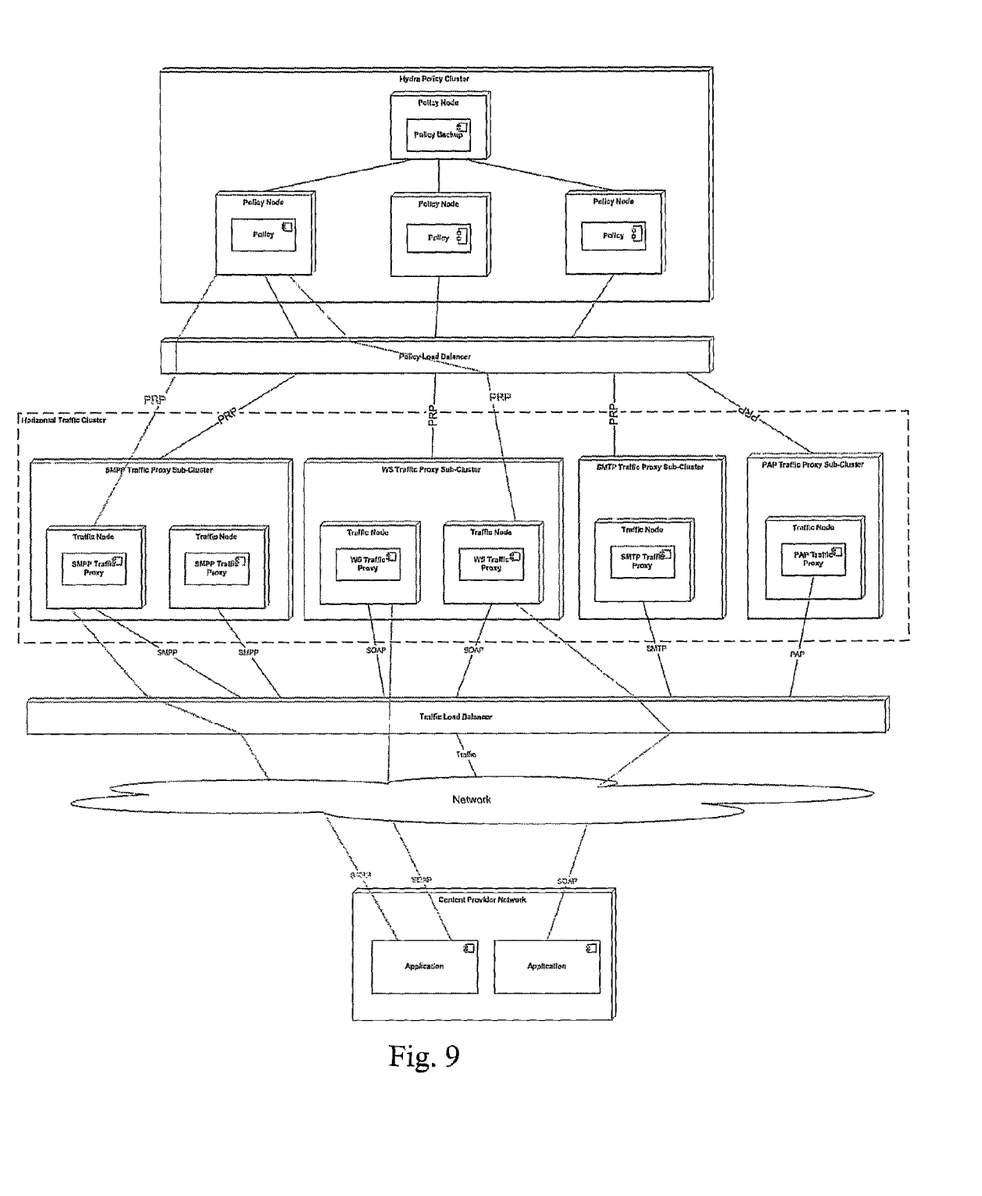
FIG. 9 is a diagram illustrating policy decisions across multiple traffic protocols across multiple applications.

Furthermore, a single traffic gateway may not be capable of handling all traffic belonging to a single content provider—yet the SLA may define traffic restrictions across multiple protocols across multiple applications belonging to a single content provider. Thus the scalable deployment model of the traffic proxies and policy engines must support the ability to allow policy decisions to be made for multiple traffic proxies, optimised for different message channels. This is shown in FIG. 9.

The invention is not limited to the embodiments described but may be varied in construction and detail.

The invention claimed is:

1. A gateway for interfacing between content provider servers and a communication network for delivery of content to user devices, the gateway comprising a work flow manager comprising:
    a process automation component for interfacing with operators and defining according to operator inputs required work flows;
    a traffic gateway for managing execution of traffic flow for delivery of content;
    a policy engine for interfacing with the process automation component and with the traffic gateway;
    wherein each of the process automation component, the policy engine, and the traffic gateway execute workflow instances; and
    wherein the policy engine workflow instances act as decision points, and the process automation component workflow instances and the traffic gateway workflow instances act as enforcement points; and
    wherein the policy engine comprises:
    policy decision nodes, each having a traffic policy, a management policy, and a decision server,
    traffic nodes communicating with the decision servers,
    management nodes communicating with the decision servers; and
    wherein the management nodes access the operator-level workflow model and the traffic nodes access a traffic-optimized work flow model;
    wherein the decision point workflow instances execute work flow rules to determine compliance of work flows with a service level agreement and generate responses to requests from the enforcement point workflow instances;
    wherein the traffic-optimized workflow model comprises a content provider hash table, each entry in said table having a random-access set of protocol objects which the policy engine will process as required by a current traffic protocol, said protocol objects point to protocol usage rate objects, the protocol usage rate objects invoking increment methods on content provider usage rate objects, and
    wherein the policy engine recognizes that traffic exceeds a service level agreement if any of the invoked increment methods exceed a maximum usage rate.

2. The gateway as claimed in claim 1, wherein the policy engine comprises an interface for access to a stored mark-up language service level agreement representation.

3. The gateway as claimed in claim 1, wherein the process automation component generates a human-readable operator-level model of desired content routing work flows, and allows dynamic operator-driven modification of said work flow.

4. The gateway as claimed in claim 1, wherein the process automation component automatically defines said desired work flows independently of the service level agreement.

5. The gateway as claimed in claim 1, wherein each request is an authentication, authorising and accounting request.

6. The gateway as claimed in claim 1, wherein the process automation component workflow instances generate:
   for some work flow processes only a single policy enforcement point request to initiate said processes,
   for some work flow processes a policy enforcement point request for each of a plurality of process tasks, and
   for some work flow processes a policy enforcement point request for only key process tasks, and
   for some work flow processes a conditional policy enforcement point request for some or all process tasks.

7. The gateway as claimed in claim 6, wherein the process tasks operate with process data at different levels within a process data model for the desired work flows.

8. The gateway as claimed in claim 6, wherein the process tasks operate with process data at different levels within a process data model for the desired work flows; and wherein the process data model incorporates branches for different content provider servers.

9. The gateway as claimed in claim 8, wherein each branch includes process data permissions governing read-only or write-enabled access to content on per-user and per-content provider server basis.

10. The gateway as claimed in claim 1, wherein there is a link for SMS communication, a link for MMS communication, and a link for WS communication.

11. The gateway as claimed in claim 1, wherein a table at the end of a chain automatically computes data according to entries to the tables in the chain.

12. The gateway as claimed in claim 1, wherein the traffic gateway comprises a traffic policy sub-cluster for each of a plurality of traffic protocols.

13. The gateway as claimed in claim 12, wherein each policy sub-cluster receives requests from the policy engine, and generates responses.

14. The gateway as claimed in claim 12, wherein each sub-cluster communicates with a traffic load balancer, which in turn routes traffic onto the mobile network or a content provider server network.

15. The computer program product comprising software code for performing work flow manager operations of a gateway of claim 1 when executing on a digital data processor.

* * * * *